United States Patent
Ono

(10) Patent No.: US 8,363,809 B2
(45) Date of Patent: Jan. 29, 2013

(54) TELECONFERENCE TERMINAL APPARATUS, RELAYING APPARATUS, AND TELECONFERENCING SYSTEM

(75) Inventor: Kojiro Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 895 days.

(21) Appl. No.: 12/519,859

(22) PCT Filed: Oct. 24, 2008

(86) PCT No.: PCT/JP2008/003020
§ 371 (c)(1),
(2), (4) Date: Jun. 18, 2009

(87) PCT Pub. No.: WO2009/054141
PCT Pub. Date: Apr. 30, 2009

(65) Prior Publication Data
US 2009/0313012 A1    Dec. 17, 2009

(30) Foreign Application Priority Data

Oct. 26, 2007    (JP) .................................. 2007-278561

(51) Int. Cl.
*H04M 3/00* (2006.01)
(52) U.S. Cl. .................. 379/202.01; 379/260; 379/158; 379/206.01; 709/204; 709/246; 709/232; 348/14.09; 348/14.08; 348/14.13; 704/201; 704/203
(58) Field of Classification Search ............. 379/202.01, 379/260, 158, 206.01, 406.01; 709/204, 709/246, 232, 247; 348/14.09, 14.08, 14.02, 348/14.13, 14.1; 704/201, 203; 713/155; 714/748; 455/416, 414.1
See application file for complete search history.

(56) References Cited

U.S. PATENT DOCUMENTS

| | | | | |
|---|---|---|---|---|
| 5,606,554 A | * | 2/1997 | Shibata et al. | 370/260 |
| 5,699,481 A | * | 12/1997 | Shlomot et al. | 704/228 |

(Continued)

FOREIGN PATENT DOCUMENTS

| | | |
|---|---|---|
| JP | 64-057861 | 3/1989 |
| JP | 2000-252981 | 9/2000 |

(Continued)

OTHER PUBLICATIONS

International Search Report issued Jan. 6, 2009 in the International (PCT) Application of which the present application is the U.S. National Stage.

*Primary Examiner* — Vijay B Chawan
(74) *Attorney, Agent, or Firm* — Wenderoth, Lind & Ponack, LLP.

(57) ABSTRACT

A teleconference terminal apparatus including: an input unit which receives a speech signal; an analyzing unit which calculates a target size on a predetermined segment basis of a speech signal; a coding unit which codes the speech signal to generate a data stream, so that the coded data size on a predetermined segment basis becomes the target size corresponding to each predetermined segment; a stream transmitting unit which transmits to a network the data stream; a receiving unit which receives the data stream transmitted from another terminal apparatus; a filtering unit which determines whether segment data is to be decoded based on data size for each predetermined segment in the received data stream, the segment data being included in the data stream; a decoding unit which decodes segment data determined to be decoded to generate a speech signal; and an output unit which outputs the generated speech signal.

13 Claims, 15 Drawing Sheets

U.S. PATENT DOCUMENTS

| | | | |
|---|---|---|---|
| 6,125,343 A * | 9/2000 | Schuster | 704/201 |
| 6,611,867 B1 * | 8/2003 | Bowman-Amuah | 709/224 |
| 6,678,654 B2 * | 1/2004 | Zinser et al. | 704/221 |
| 7,062,434 B2 * | 6/2006 | Zinser et al. | 704/233 |
| 7,165,035 B2 * | 1/2007 | Zinser et al. | 704/500 |
| 7,225,224 B2 * | 5/2007 | Nakamura | 709/204 |
| 7,359,497 B2 * | 4/2008 | Morishima et al. | 379/202.01 |
| 7,664,057 B1 * | 2/2010 | Wu et al. | 370/260 |
| 7,724,885 B2 * | 5/2010 | Jarske et al. | 379/202.01 |
| 7,747,782 B2 * | 6/2010 | Hunt et al. | 709/246 |
| 7,813,378 B2 * | 10/2010 | Gass | 370/474 |
| 2004/0015550 A1 * | 1/2004 | Nakamura | 709/204 |
| 2006/0035630 A1 * | 2/2006 | Morishima et al. | 455/416 |
| 2006/0227785 A1 * | 10/2006 | Cournut et al. | 370/392 |
| 2008/0260132 A1 * | 10/2008 | Zhang et al. | 379/202.01 |
| 2010/0031109 A1 * | 2/2010 | Muramoto et al. | 714/748 |

FOREIGN PATENT DOCUMENTS

| | | |
|---|---|---|
| JP | 2003-316398 | 11/2003 |
| JP | 2007-150877 | 6/2007 |
| JP | 2007-195136 | 8/2007 |

* cited by examiner

FIG. 1
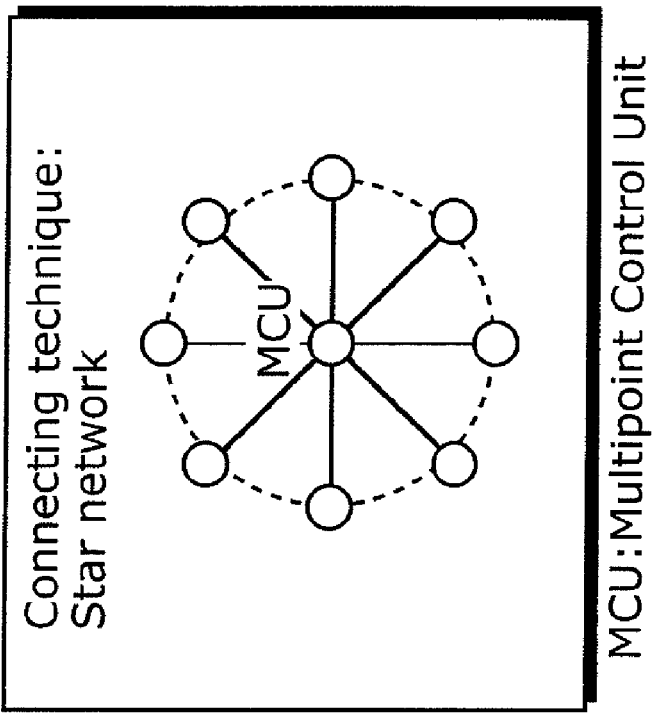
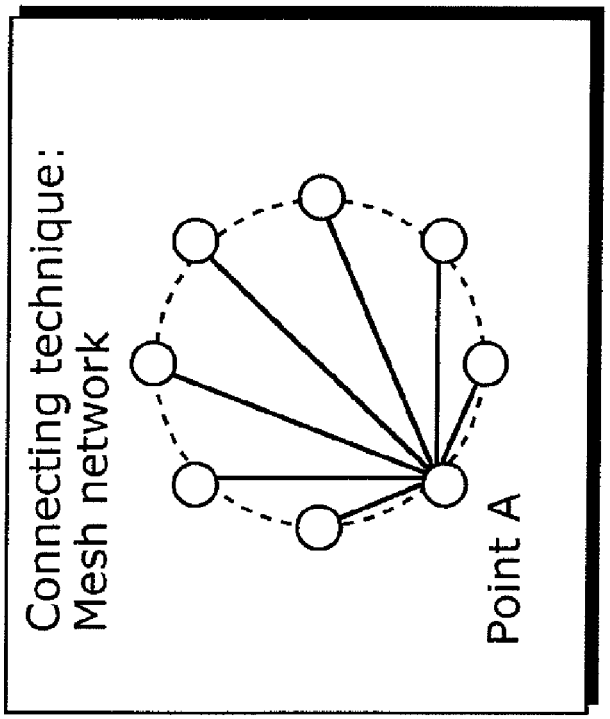

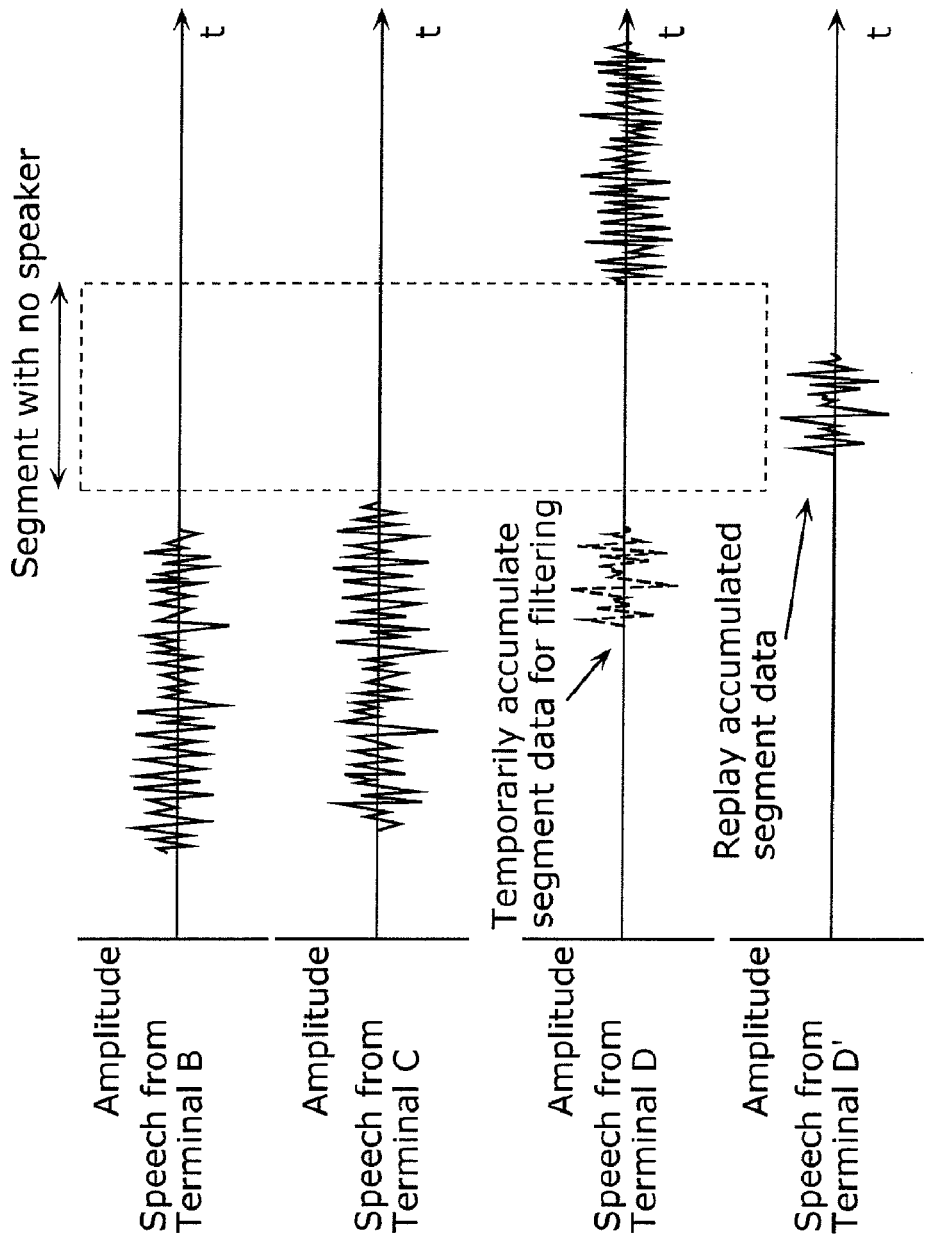

TELECONFERENCE TERMINAL APPARATUS, RELAYING APPARATUS, AND TELECONFERENCING SYSTEM

BACKGROUND OF THE INVENTION

1. Technical Field

The present invention relates to a teleconference terminal apparatus, a relaying apparatus, and a teleconferencing system performing speech communications between plural terminals via an IP network.

2. Background Art

Recent development of an IP network has made possible image and speech communications on the IP network. This has commercialized a multipoint teleconferencing system to realize image and speech communications between multi points.

The techniques connecting between each of terminals in the multipoint teleconferencing system are typically classified into the mesh network and the star network. FIG. 1 shows the connecting techniques.

It is noted that the drawing illustrating the mesh network in FIG. 1 shows the point A-centered connection relation alone for simplicity, and a connection relation with another terminal centered is omitted.

In the case where there are n terminals, the mesh type allows each of the terminals to establish a direct connection to another N−1 terminal without routing through a relay point. In this case, a stream traveling through the network does not route through an unnecessary relay point. This makes possible avoiding a further stream delay however more the number of terminals increases.

In the mesh type, however, each terminal needs to decode the stream from the N−1 terminal. Hence, the number of connection points is required to be limited depending on terminal performance. Further, the mesh type presents a drawback of causing packet delay due to increasing network traffic.

In the star type, streams transmitted from each of the terminals are once brought together to an MCU (Multipoint Control Unit). Then, the MCU decodes and mixes the streams, and the mixed speech signal is coded and transmitted to each of the terminals.

In this case, since decoding a stream of the mixed speech signal, each terminal is free from a load however more the number of terminals increases. Routing through the MCU, however, develops a stream delay. Moreover, the star type presents a drawback of overloading the MCU.

As described above, the multipoint teleconferencing system, employing either the mesh-type connecting technique or the star-type connecting technique, tends to significantly overload each of the terminals or the MCU. Thus, another technique has been proposed to delete speech data based on information of speech amplitude in order to alleviate network overload and processing amount in decoding (See Patent Reference 1, for example).

[Patent Reference 1: Japanese Unexamined Patent Application Publication No. 2000-252981]

As the multipoint teleconferencing system has become commercially available, users have started to request more participants to a teleconference with the use of more terminals and higher sound quality which was unavailable before.

In particular, realizing a teleconferencing system having high sound quality needs to employ the MPEG (Moving Picture Experts Group) Audio used for music, rather than a speech codec having a narrow bandwidth.

Deleting an unnecessary stream as shown in the Patent Reference 1 in the conventional technique requires a speech codec, such as G. 729 including information on speech amplitude.

It is noted that a stream in the MPEG Audio also includes gain information; that is, a kind of information on speech amplitude. Accurate speech amplitude, however, is not available unless the stream is decoded once.

In other words, obtaining the accurate speech amplitude out of a stream which conforms to the MPEG Audio standard causes further processing overloading; that is, decoding the stream for the accurate amplitude.

In addition, even though the data amount of streams transmitted from each of the terminals reduces, each terminal needs to decode in parallel as many streams as the other terminals. Thus, increasing number of terminals directly results in further processing overloading on each of the terminals.

SUMMARY OF THE INVENTION

The present invention is conceived in view of the above problems and has as an objective to provide a teleconference terminal apparatus, a relaying apparatus, and a teleconferencing system which make possible realizing high sound quality and yielding an increase in processing overloading due to an increase in the number of simultaneous participants.

In order to achieve the objective, a teleconference terminal apparatus in the present invention, performing speech communications with another terminal apparatus via a network, includes: an input unit which receives a speech signal; an analyzing unit which analyzes the speech signal received by the input unit and calculates a target size based on a result of the analysis, the target size representing a coded data size regarded as a target of the speech signal on a predetermined segment basis; a coding unit which codes the speech signal to generate a data stream, so that the coded data size on the predetermined segment basis becomes the target size corresponding to each of predetermined segments; a stream transmitting unit which transmits to the network the data stream generated by the coding unit; a receiving unit which receives the data stream transmitted from the other terminal apparatus; a filtering unit which determines whether or not segment data is to be decoded on a basis of the data size for each predetermined segment in the data stream received by the receiving unit, the segment data being designated on the predetermined segment basis and included in the data stream; a decoding unit which decodes segment data determined to be decoded by the filtering unit to generate a speech signal; and an output unit which outputs the speech signal generated by the decoding unit.

Thanks to the above structure, the teleconference terminal apparatus in the present invention can notify another terminal of a degree of speech amplitude for each of data streams according to a data size of each data stream without assigning to the data stream information indicating speech amplitude, or transmitting and receiving information indicating the speech amplitude in addition to the data stream.

Further, thanks to the above structure, the teleconference terminal apparatus in the present invention can recognize a degree of speech amplitude for each of data streams received from the other terminal out of a data amount for each of the data streams without decoding the data stream. In addition, the teleconference terminal can decode a segment having relatively great speech amplitude alone rather than decode a segment, having relatively small speech amplitude, which is in practice possibly unnecessary for an audio teleconference.

Moreover, a relaying apparatus in the present invention, connected to terminal apparatuses and relaying transmission and reception of a data stream between the terminal apparatuses, includes: a receiving unit which receives the data stream transmitted from any one of the terminal apparatuses; a filtering unit which determines whether or not segment data is to be transmitted to a terminal apparatus other than the terminal apparatus as a source terminal transmitting the data stream on a basis of a data size for each predetermined segment in the data stream received by the receiving unit, the segment data being designated on the predetermined segment basis and included in the data stream; and a data transmitting unit which transmits segment data to the terminal apparatus other than the terminal apparatus as the source terminal transmitting the data stream, the segment data being determined to be transmitted to the filtering unit.

Thanks to the above structure, the relaying apparatus in the present invention can determine whether or not all or part of the data stream shall be transmitted to another terminal by referring a data size on a segment basis without decoding the data stream when receiving the data stream from the terminal apparatus.

In addition, a first teleconference system in the present invention can be implemented by having plural teleconferencing apparatuses in the present invention.

Further, a second teleconferencing system includes teleconference terminal apparatuses and a relaying apparatus connected via a network, and performs speech communications between the teleconference terminal apparatuses via the relaying apparatus, wherein each of the teleconference terminal apparatuses includes: an input unit which receives a speech signal; an analyzing unit which analyzes the speech signal received by the input unit and to calculate a target size based on a result of the analysis, the target size representing a coded data size regarded as a target of the speech signal on a predetermined segment basis; a coding unit which codes the speech signal to generate a data stream, so that the coded data size on the predetermined segment basis becomes the target size corresponding to each of predetermined segments; a stream transmitting unit which transmits to the relaying apparatus the data stream generated by the coding unit; a receiving unit which receives segment data from the relaying apparatus, the segment data representing data designated for each predetermined segment, and included in a data stream transmitted from another teleconference terminal apparatus; a decoding unit which decodes the segment data determined to be decoded by the filtering unit to generate a speech signal; and an output unit which outputs the speech signal generated by the decoding unit, and the relaying apparatus includes: a receiving unit which receives the data stream transmitted from any one of the teleconference terminal apparatuses; a filtering unit which determines whether or not the segment data is to be decoded on a basis of the data size for each predetermined segment in the data stream received by the receiving unit, the segment data being designated on the predetermined segment basis and included in the data stream; and a data transmitting unit which transmits the segment data to a teleconference terminal apparatus other than the teleconference terminal apparatus as a source terminal transmitting the data stream, the segment data being determined to be decoded by the filtering unit.

A teleconference terminal apparatus in the present invention can notify other terminals of the degree of speech amplitude on a terminal-to-terminal basis without processing such as adding information on the speech amplitude to a data stream.

Further, the teleconference terminal apparatus in the present invention can make determination to avoid decoding segment data, having relatively small speech amplitude, included in a data stream received from another terminal. In other words, the teleconference terminal apparatus in the present invention can alleviate a load on decoding compared with a conventional teleconference terminal apparatus.

Thus, the teleconference terminal apparatus in the present invention can adopt a conventional codec including the MPEG AAC as a coding method, as well as alleviate a load in decoding performed by the teleconference terminal apparatus and a terminal at a communications partner.

Moreover, the relaying apparatus in the present invention can filter out interval data having relatively small speech amplitude in data streams transmitted and received between plural terminals, the speech amplitude which is regarded unnecessary in effect for an audio teleconference.

The present invention is conceived in view of the above problems and has as an objective to provide a teleconference terminal apparatus, a relaying apparatus, and a teleconferencing system which make possible realizing high sound quality and yielding an increase in processing overloading due to an increase in the number of simultaneous participants.

In other words, the present invention enables to establish a multipoint teleconferencing system including significantly larger number of terminals than the previous number of simultaneously participating terminals.

BRIEF DESCRIPTION OF DRAWINGS

FIG. 1 exemplifies connection methods of conventional multipoint teleconferencing systems.

FIG. 15 illustrates accumulation and decoding of a frame performed by a teleconference terminal apparatus in a fourth embodiment of the present invention.

Figure 2:
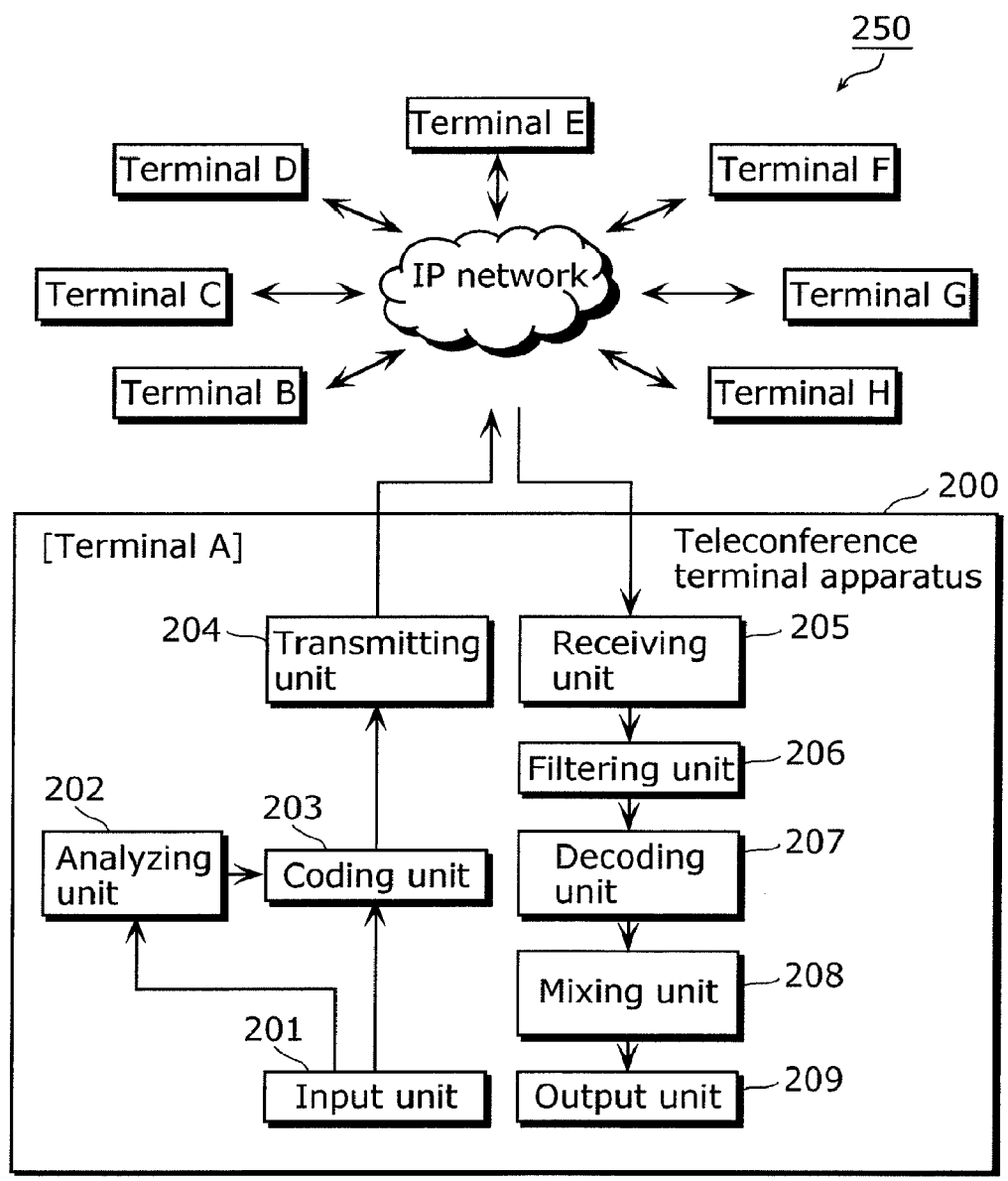
FIG. 2 shows a structure of a multipoint teleconferencing system in a first embodiment of the present invention.

NUMERICAL REFERENCES 200, 700, and 1000 Teleconference terminal apparatus
201, 701, and 1001 Input unit
202, 702, and 1002 Analyzing unit
203, 703, and 1003 Coding unit
204, 704, 903, and 1004 Transmitting unit
205, 705, 901, and 1005 Receiving unit
206, 706, 902, and 1006 Filtering unit
207, 707, and 1007 Decoding unit
208, 708, and 1008 Mixing unit
209, 709, and 1009 Output unit
250, 750, 950, and 1050 Multipoint teleconferencing system
710 Priority level setting unit
711 Priority level obtaining unit
1010 Accumulating unit

DETAILED DESCRIPTION OF THE INVENTION

Hereinafter, embodiments of the present invention shall be described with reference to the drawings.

First Embodiment

FIG. 2 shows a structure of a multipoint teleconferencing system 250 in a first embodiment of the present invention.

The multipoint teleconferencing system 250 in the first embodiment includes plural terminals each connected through an IP network.

As shown in FIG. 2, for example, the multipoint teleconferencing system 250 includes eight terminals mutually connected via the IP network, each of the eight terminals which has a corresponding name; that is, Terminals A to H. In addition, the teleconference terminal apparatus 200 in FIG. 2 is referred to as Terminal A. Here, any of Terminals B to H is terminal apparatuses which are equivalent to the teleconference terminal apparatus 200, or have a function equivalent to the teleconference terminal apparatus 200.

Further, the multipoint teleconferencing system 250 in the embodiment is assumed to have each of the terminals mutually connected in the mesh network via the IP network in order to dispense with the MCU. Meanwhile, the star network may be adopted as a connecting technique for the multipoint teleconferencing system 250.

The teleconference terminal apparatus 200 includes an input unit 201, an analyzing unit 202, a coding unit 203, a transmitting unit 204, a receiving unit 205, a filtering unit 206, a decoding unit 207, a mixing unit 208, and an output unit 209.

The input unit 201 is a processing unit receiving a speech signal as an input via, for example, a microphone.

The analyzing unit 202 is a processing unit analyzing the provided speech signal and calculating a target size based on the analysis result, the target size which is an after-coding data size regarded as a target of the speech signal on a predetermined interval basis.

The coding unit 203 is a processing unit generating a data stream by coding the speech signal so that the after-coding data size on the predetermined interval basis becomes a target size corresponding to each of intervals.

The transmitting unit 204 is a processing unit packetizing the data stream generated by the coding unit 203 and transmitting the packetized data stream to the IP network.

The receiving unit 205 is a processing unit receiving a data stream transmitted from another terminal.

The filtering unit 206 is a processing unit determining whether or not interval data should be decoded based on the data size, on a predetermined interval basis, of the received data stream, the interval data which is data, on the predetermined interval basis, included in the data stream. Further, the filtering unit 206 may delete interval data determined not to be decoded.

The decoding unit 207 is a processing unit decoding interval data, which the filtering unit 206 determines to decode, to generate a speech signal.

The mixing unit 208 is a processing unit to perform mixing according to a replay environment of the teleconference terminal apparatus 200 in the case where plural speech signals are generated by the decoding unit 207.

Here, the replay environment of the teleconference terminal apparatus 200 is represented by, for example, a kind, performance, and the number of speech output apparatuses connected to the teleconference terminal apparatus 200, such as a speaker. Meanwhile, the mixing unit 208 may perform mixing according to acoustical conditions in which the teleconference terminal apparatus 200 is placed.

The output unit 209 is a processing unit to output a mixed speech signal in the case where the mixing unit 208 mixes speech signals, and an unmixed speech signal generated by the decoding unit 207 in the case where the mixing unit 208 does not mix speech signals.

It is noted in the first embodiment and second to fourth embodiments described hereinafter that a frame, which is a unit to form a data stream, is adopted as the above segment data.

Meanwhile, a predetermined period; that is one-second basis, may also be adopted. Moreover, the MPEG2 AAC may be adopted as a coding method to generate a data stream, for example.

In the case of the MPEG2 AAC, a sampling frequency of 48 kHz provides a frame length of approximately 21.3 ms (millisecond).

FIGS. 3 to 9 show a process of receiving the speech signal, coding the speech signal, and then transmitting the stream, which is performed by the above-structured teleconference terminal apparatus 200.

First, a flow of transmission processing in the teleconference terminal apparatus 200 shall be described with reference to FIG. 3.

Figure 3:
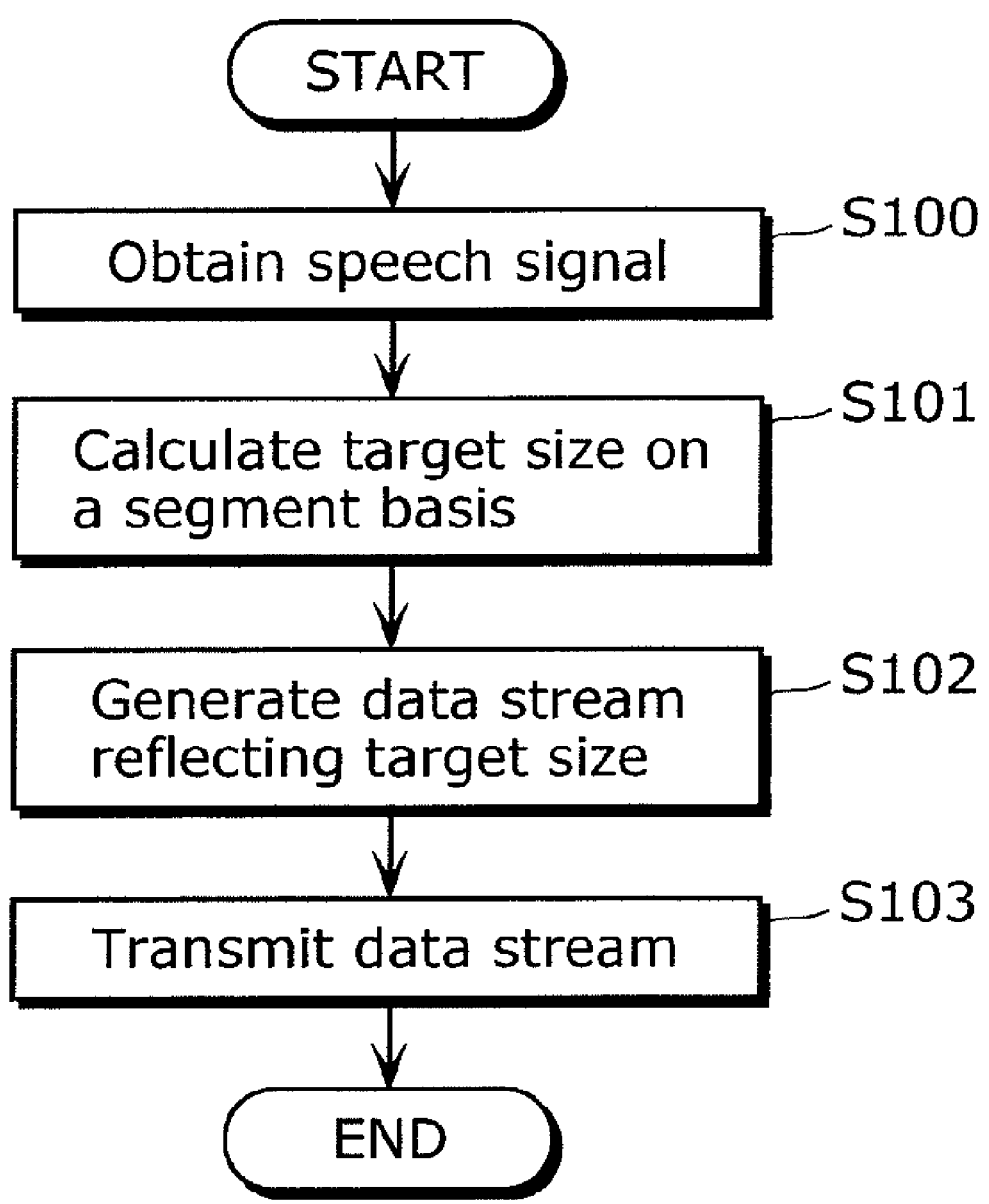
FIG. 3 is a flowchart showing a flow of processing in transmission of a data stream in the teleconference terminal apparatus of the first embodiment.

FIG. 3 is a flowchart showing a flow of processing in transmission of the data stream in the teleconference terminal apparatus 200 of the first embodiment.

First, the input unit 201 receives an input of the speech signal to obtain the speech signal (S100).

Next, the analyzing unit 202 calculates the target size on a frame basis according to an analysis result of the speech signal (S101). Specifically, the analyzing unit 202 analyzes the speech signal to obtain speech amplitude on a frame basis. Then, the analyzing unit 202 calculates the target size on the frame basis based on an associated piece of the obtained speech amplitude.

Figure 4:
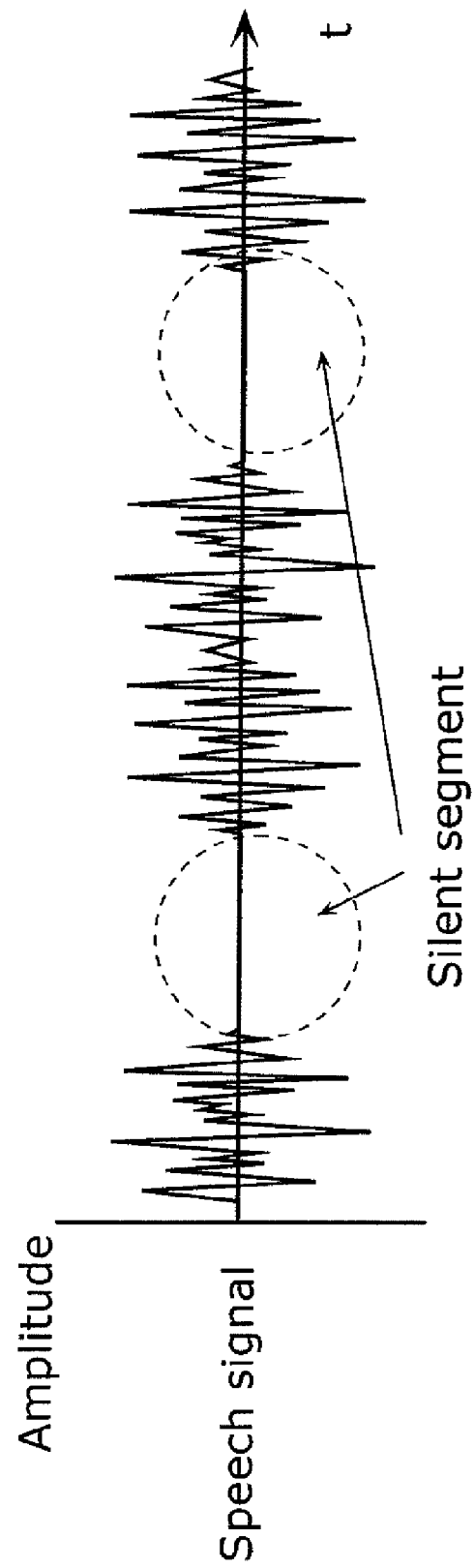
FIG. 4 exemplifies a speech signal provided to the teleconference terminal apparatus in the first embodiment.
Figure 5:
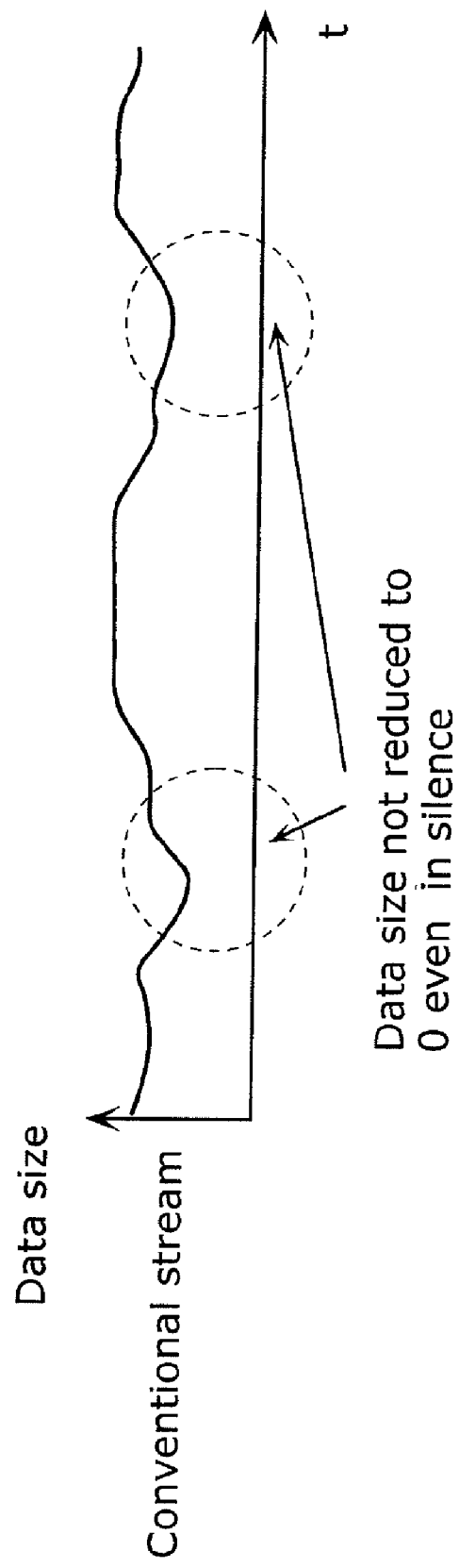
FIG. 5 exemplifies a data size of a conventional audio stream.
Figure 6:
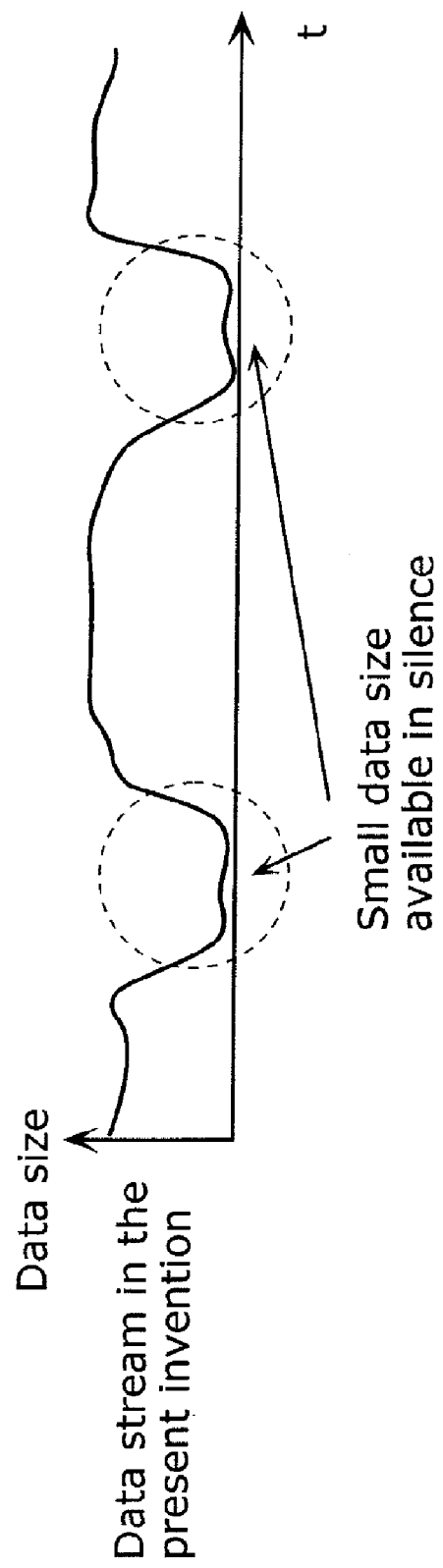
FIG. 6 exemplifies a data size of the data stream in the first embodiment.

This calculating processing shall be described with FIGS. 4 to 6.

FIG. 4 exemplifies a speech signal provided to the teleconference terminal apparatus 200.

FIG. 5 exemplifies a data size of a conventional audio stream.

FIG. 6 exemplifies a data size of the data stream in the first embodiment.

The speech signal provided to the teleconference terminal apparatus 200 is generated out of a speech by a participant using the teleconference terminal apparatus 200. Thus, as shown in FIG. 4, the speech signal typically includes silent segments each having zero or very small amplitude.

Coding the speech signal as has been coded on an audio codec including the MPEG 2 AAC intends to keep the size of each of frames at a certain rate as shown in FIG. 5.

This is because a conventional audio codec, such as the MPEG 2 AAC, is designed for broadcast.

Thus, the conventional audio codec has forwarded the data stream at a certain bit rate even though the speech signal includes the silent segments. In reality, this keeps a data size corresponding to a silent segment from becoming zero or closer.

Meanwhile, the teleconference terminal apparatus 200 in the present invention includes the analyzing unit 202 calculating the target size on a frame basis. This makes possible changing the data size of each frame in the data stream depending on the speech amplitude.

In the embodiment, the analyzing unit 202 calculates the target size on a frame basis so that the speech amplitude on the frame basis and target size on the frame basis are in a positive correlation.

Specifically, as shown in FIG. 6, the analyzing unit 202 calculates the target size so that a data size having a small speech amplitude part, such as a silent segment, becomes smaller in proportion to the speech amplitude.

It is noted that the speech amplitude on the frame basis and the target size on the frame basis may be linearly, as well as non-linearly, proportional. For example, the analyzing unit 202 may calculate a preliminarily set value as the target size of a frame as far as the speech amplitude of the frame is within a predetermined range.

Each of calculated target sizes is forwarded to the coding unit 203. The coding unit 203 generates a data stream reflecting the target sizes.

This allows another terminal receiving the data stream transmitted from the teleconference terminal apparatus 200 to readily estimate the speech amplitude on a frame basis out of the data size on the frame basis, eliminating the need for decoding the data stream, even though the data stream is generated by a codec employing variable length frames, such as the MPEG2 AAC.

Hence, the analyzing unit 202 calculates the target size; that is, an after-coding data size provided as a target of the speech signal on a frame basis depending on the analysis result.

Next, the coding unit 203 codes the speech signal to generate a data stream, so that the after-coding data size on the frame basis becomes a target size corresponding to each frame (S102).

The generated data stream is packetized by the transmitting unit 204 and transmitted to another terminal via the IP network (S103).

Described next is processing by the teleconference terminal apparatus 200 decoding the stream received from the IP network to provide the speech.

It is noted as described above that each of Terminals B to H is the teleconference terminal apparatus 200, or a terminal having functions equivalent to the teleconference terminal apparatus 200.

Thus a data size, of each of frames in a corresponding data stream transmitted from associated one of Terminals B to H, reflects the speech amplitude of the speech signal which is a source of each data stream.

Figure 7:
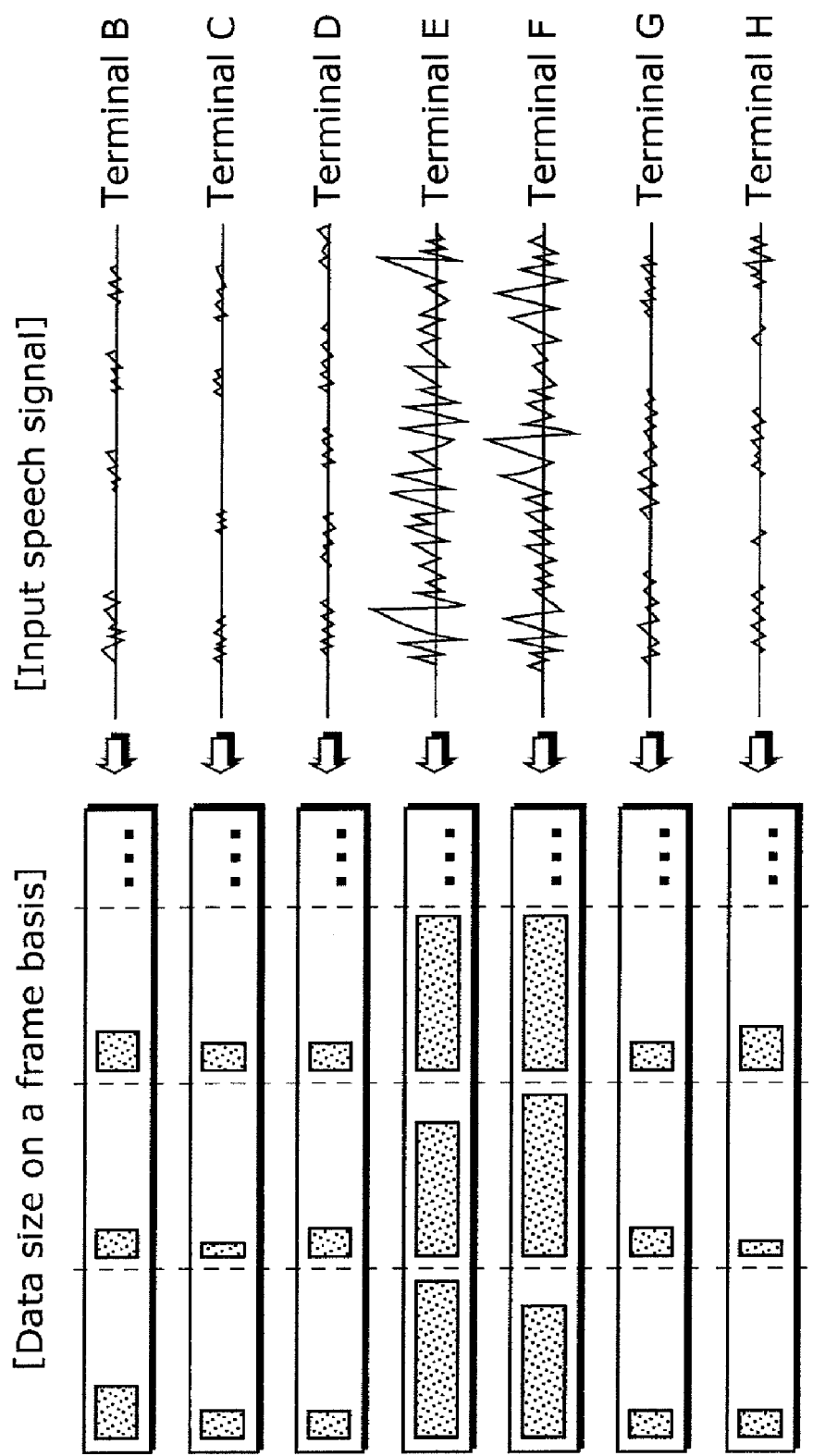
FIG. 7 exemplifies a data size of each of frames in a data stream transmitted from each of plural terminals

FIG. 7 exemplifies the data size of each of the frames in the corresponding data stream transmitted from associated one of Terminals B to H.

In FIG. 7, the length of a rectangle with dots in a horizontal direction represents a data size on a frame basis.

Such a data stream having a different data size on a frame basis arrives at Terminal A; namely the teleconference terminal apparatus 200, via the IP network.

Figure 8:
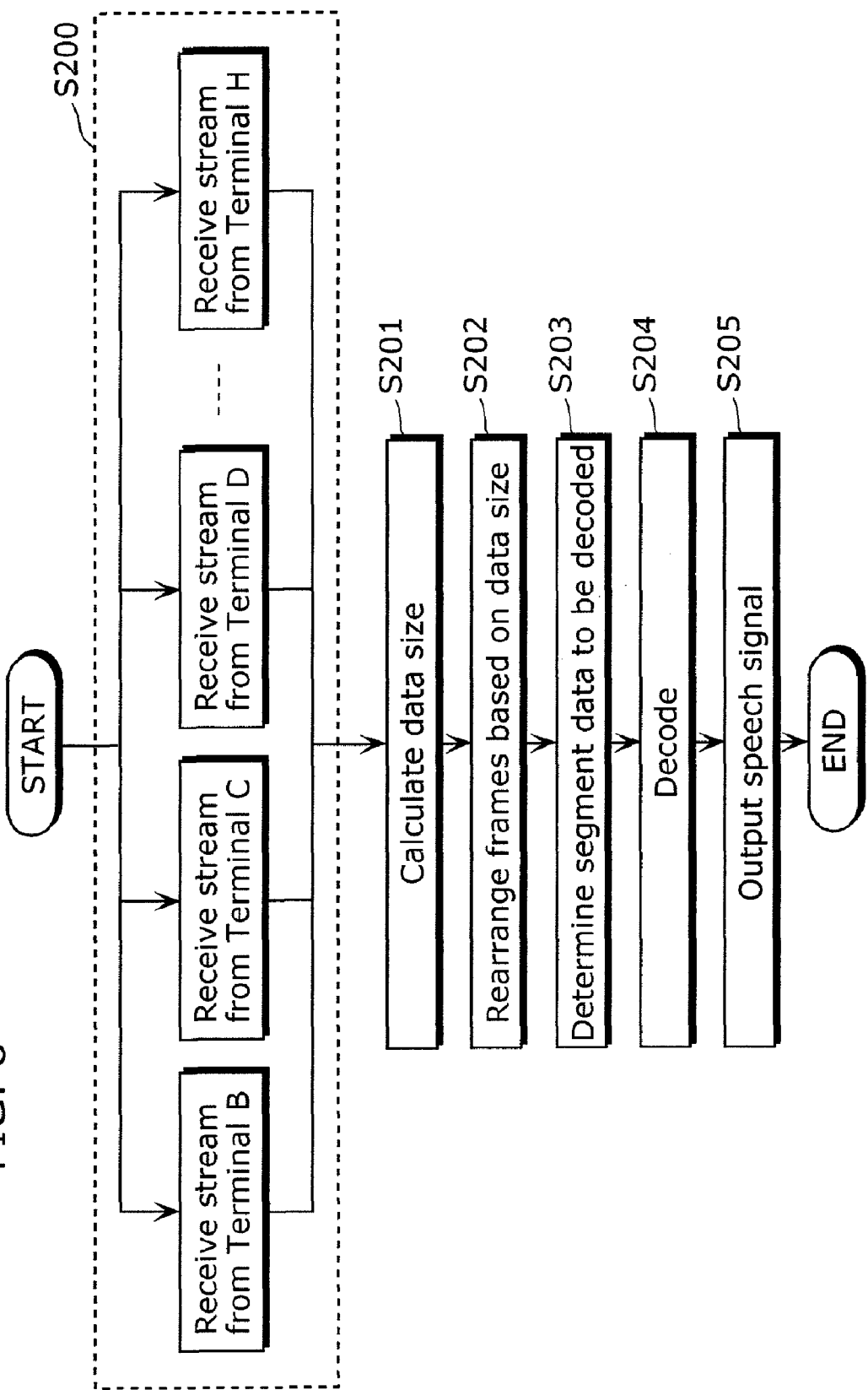
FIG. 8 is a flowchart showing a flow of processing regarding reception of the data stream in the teleconference terminal apparatus of the first embodiment.
Figure 9:
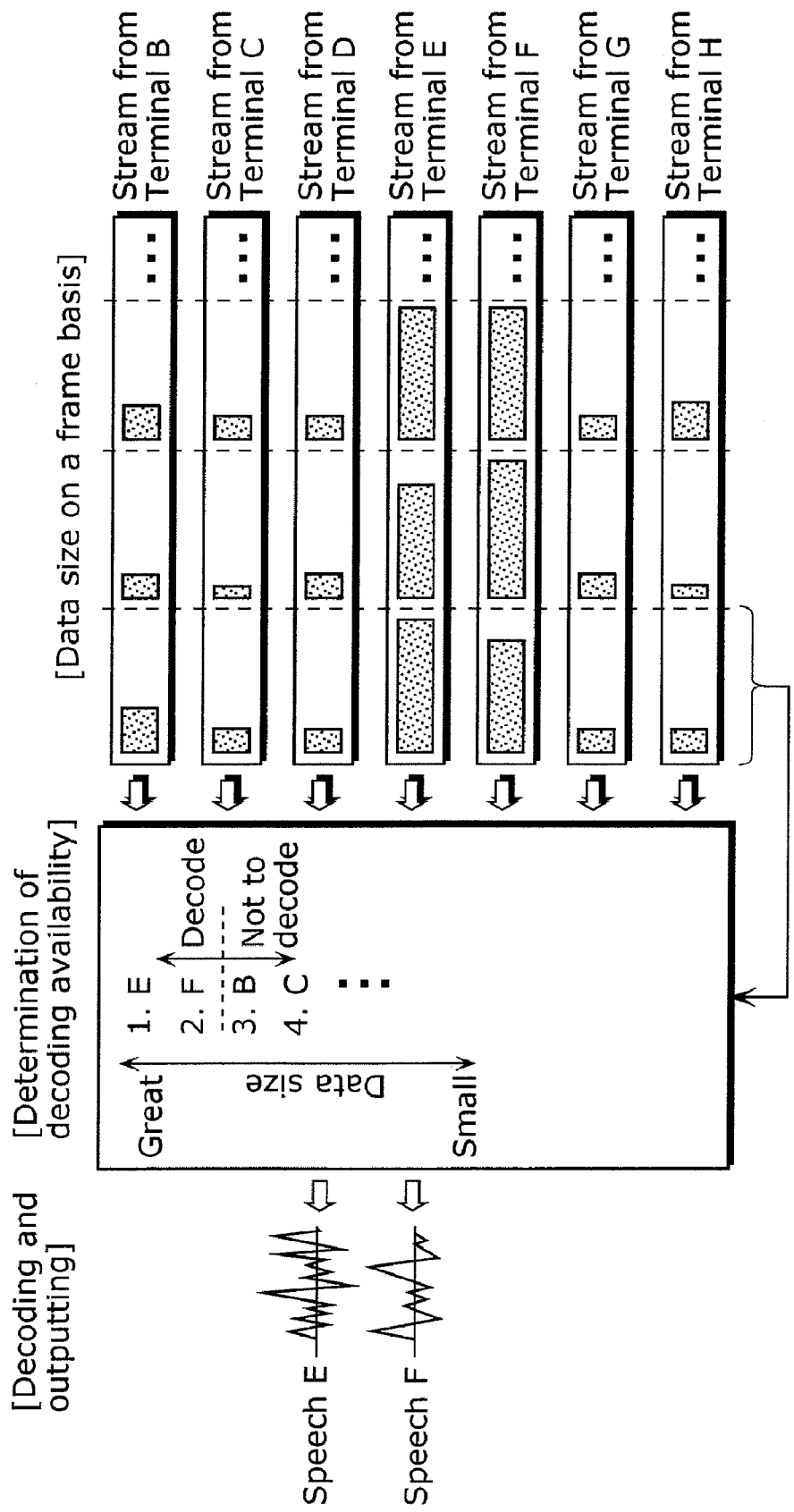
FIG. 9 exemplifies processing to determine availability of decoding in the teleconference terminal apparatus of the first embodiment.

Assuming the above, processing in data reception performed by the teleconference terminal apparatus 200 shall be described, using FIGS. 8 and 9.

FIG. 8 is a flowchart showing a flow of processing regarding reception of the data stream in the teleconference terminal apparatus 200 of the first embodiment.

As shown in FIG. 8, the data stream transmitted from each of the terminals via the IP network is received by the receiving unit 205 (S200).

The filtering unit 206 refers to the data size of each of the frames in the corresponding received data stream in order to determine whether or not the data of each frame in the corresponding data stream; that is each piece of segment data included in the corresponding data stream, is to be decoded.

Specifically, the filtering unit 206 first calculates a data size of a frame at a specific time out of each of the data streams, from the corresponding terminal, received by the receiving unit 205 (S201). The data size is held in a predetermined recording medium, included in the filtering unit 206, in a form of an associative array having the ID of the terminal and the data size as a key and a value, respectively.

Next, the filter unit 206 rearranges plural frames in a data size order (S202). This is implemented by rearranging the associative array in a descending order of values. It is noted that the frames may be rearranged by associating the terminal and the data size. Thus, the rearrangement shall not be limited to this technique.

Moreover, the "rearrangement of the frames" means to prioritize for selecting the frames to be decoded, rather than to actually rearrange the frames per se in the recording medium.

At the end, the filtering unit 206 determines segment data to be decoded (S203). The determination is made by, for example, deleting a frame having a smaller data size than a predetermined threshold or screening out the frame out of frames to be decoded.

It is noted that there are some other techniques to determine a frame to be decoded among plural frames.

For example, the determination may also be made by deleting a frame having a smaller data size than a predetermined threshold or screening out the frame out of frames to be decoded.

Further, the judgment, for example, may also be made by selecting a frame to be decoded having a data size greater than a predetermined threshold.

In addition, the judgment, for example, may also be made by selecting a predetermined number of frames to be decoded among plural frames in a descending order in data size.

It is noted that the filtering unit 206 may also make determination to screen a frame to be decoded out by determining that a sound has likely been produced when observing a surge of power in a very short period, rather than to make determination simply based on the data size of a frame.

It is noted that the number of frames to be simultaneously decoded by the teleconference terminal apparatus 200; that is the number of frames to be decoded by the above various kinds of determination, is decided, for example, according to processing capability of the teleconference terminal apparatus 200.

FIG. 9 exemplifies processing to determine availability of decoding in the teleconference terminal apparatus 200 of the first embodiment.

It is noted that FIG. 9 exemplifies the case where the teleconference terminal apparatus 200 selects only two greatest frames in data size out of the plural frames.

As shown in FIG. 9, assumed is the case where, in a certain segment, the data size in the frame of Terminal E is the greatest, followed by the data size in the frame of Terminal F out of plural frames corresponding to plural speech signals to be simultaneously provided.

Here, the filtering unit 206 selects the frames of Terminals E and F as data to be decoded, and determines to decode the selected frames. In addition, frames other than the frames determined to be decoded may be deleted.

Such determination may be made by a predetermined segment, such as by one second, as well as by a frame length.

It is noted that a data size of a frame included in a stream is predetermined by the speech amplitude corresponding to the frame. Hence, the deleted frame or the frame screened out of decoding is relatively small in speech amplitude.

Thus, even though the frame is decoded and provided in a form of sound, the frame is highly likely masked by another speech having greater speech amplitude.

Therefore, deleting the frame to be highly likely masked gives no substantial problems to the listener.

The teleconference terminal apparatus 200 performs the above processing to delete a frame to be highly likely masked when the number of simultaneously attending terminals increases, as well. This allows reduction of processing load on the teleconference terminal apparatus 200 when decoding. Consequently, the teleconference terminal apparatus 200 makes possible holding an audio teleconference having simultaneous participants more than a conventional audio has in adopting the teleconference terminal apparatus 200 as a terminal to be used by a participant.

Next, the decoding unit 207 decodes streams passing through the filtering unit 206. In other words, the decoding unit 207 decodes frames which the filtering unit 206 has determined to decode (S204).

The mixing unit 208 mixes speech signals (two speech signals in FIG. 9), of mufti points, obtained from the decoding unit 207 according to a replay environment of the teleconference terminal apparatus 200.

The replay environment of the teleconference terminal apparatus 200 includes, for example, the number and kinds of speakers connected to the teleconference terminal apparatuses 200.

At the end, output unit 209 outputs a mixed signal obtained from the mixing unit 208 (S205).

As described above, the teleconference terminal apparatus 200 in the first embodiment performs coding on the incoming speech signals, aiming to provide the speech signals a data size on a predetermined segment basis according to actual speech amplitude.

This allows another terminal, receiving a stream from the teleconference terminal apparatus 200, to assume speech amplitude on a predetermined segment basis without decoding the stream. In other words, the teleconference terminal apparatus 200 can determine whether or not the stream should be decoded on the predetermined segment basis.

Moreover, the teleconference terminal apparatus 200 determines segment data to be decoded and forwarded out of a data size of the predetermined segment included in the received stream.

In other words, without decoding the received stream, the teleconference terminal apparatus 200 refers to the data size on the predetermined segment basis to assume the speech amplitude, on the predetermined segment basis, in the stream.

This allows the teleconference terminal apparatus 200 to avoid decoding segment data; that is, original data, of a speech, which is masked by another speech, very likely overheard, and relatively small in speech amplitude, even though forwarded.

The teleconference terminal apparatus 200, structured to perform the above processing, makes possible easy determination of availability of decoding on a stream at each terminal, even in the case where a codec which can realize high sound quality, such as the MPEG2 AAC, is adopted. Thus, the use of the teleconference terminal apparatus 200 by a participant makes possible implementing a high-sound-quality teleconferencing system involving users and a lot of terminals.

Second Embodiment

Figure 10:
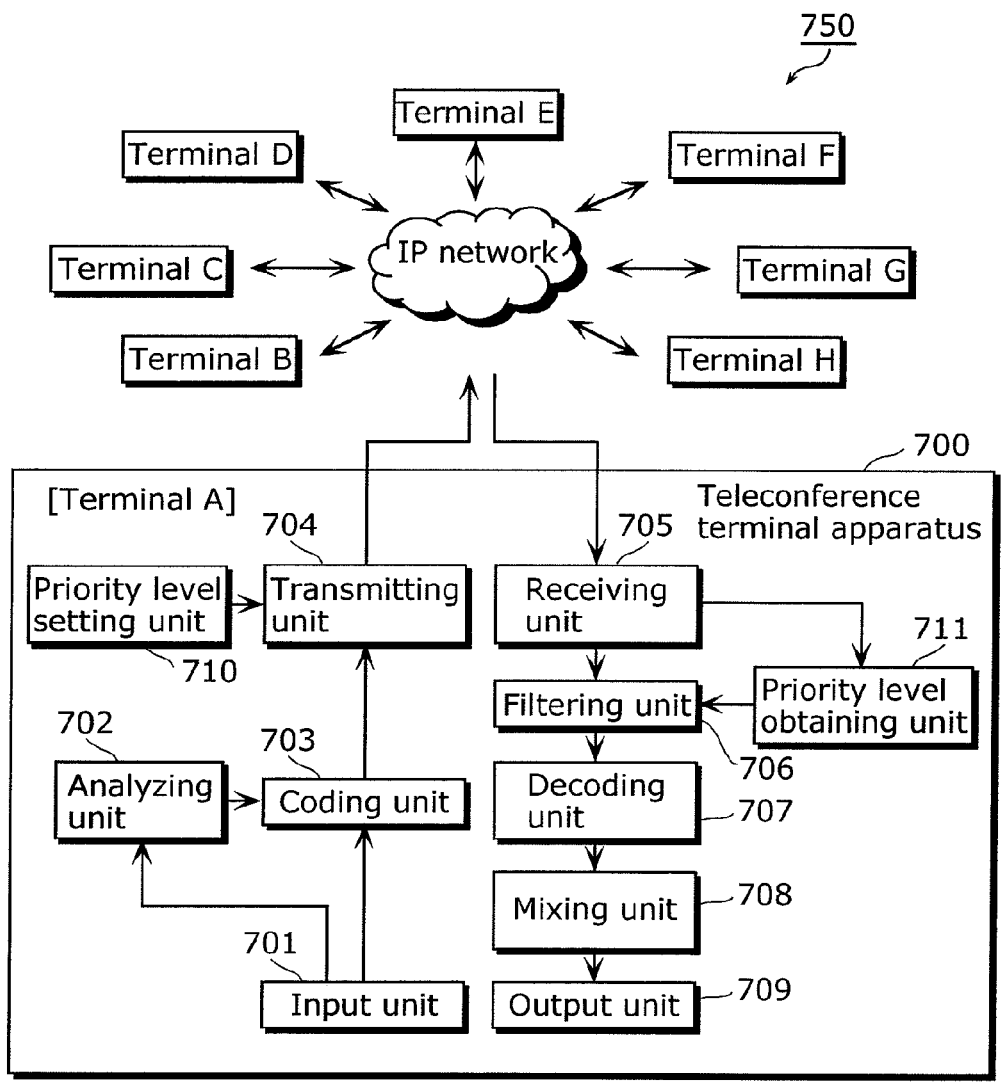
FIG. 10 shows a structure of a multipoint teleconferencing system in a second embodiment of the present invention.

FIG. 10 shows a structure of a multipoint teleconferencing system 750 in a second embodiment of the present invention.

The teleconference terminal apparatus 700 in the second embodiment includes an input unit 701, an analyzing unit 702, a coding unit 703, a transmitting unit 704, a receiving unit 705, a filtering unit 706, a decoding unit 707, a mixing unit 708, an output unit 709, a priority level setting unit 710, and a priority level obtaining unit 711.

As described above, the teleconference terminal apparatus 700 in the second embodiment includes the priority level setting unit 710 assigning to the data stream priority level information indicating a priority level of a data stream, and the priority level obtaining unit 711 for obtaining the priority level information out of the received data stream, as well as the processing units included in the teleconference terminal apparatus 200 in the first embodiment.

It is noted that the priority level information may be transmitted and received separately from the data stream.

Further, the filtering unit 706 in the second embodiment is different from the filtering unit 206 in the first embodiment since the filtering unit 706 takes a priority level into account in determining availability of decoding a frame, the priority which is associated with the frame.

The following describes the newly-added structural elements in details, and omits the description of the other structural elements similar to those in the first embodiment.

The priority level information is represented in integer number and alphabet. For example, the priority level information is represented in an integer number with "0" designated to have the highest priority.

It is noted that any given information may be the priority level information as far as rearrangement of pieces of segment data is possible by comparison.

The priority level setting unit 710 assigns the priority level information to the data stream obtained from the coding unit 703, the priority level information which indicates priority of a participant using the terminal (Terminal A in FIG. 10).

It is noted that only selected one or more terminals may be subject to transmitting the priority level information depending on a priority level of the participant, and the other terminals may not transmit the priority level information.

Meanwhile, the priority level obtaining unit 711 obtains the priority level information out of the data stream received by the receiving unit 705.

The filtering unit 706 refers to the priority level information obtained from the priority level obtaining unit 711, and preferentially provides to the decoding unit 707 a frame included in a prioritized data stream.

Figure 11:
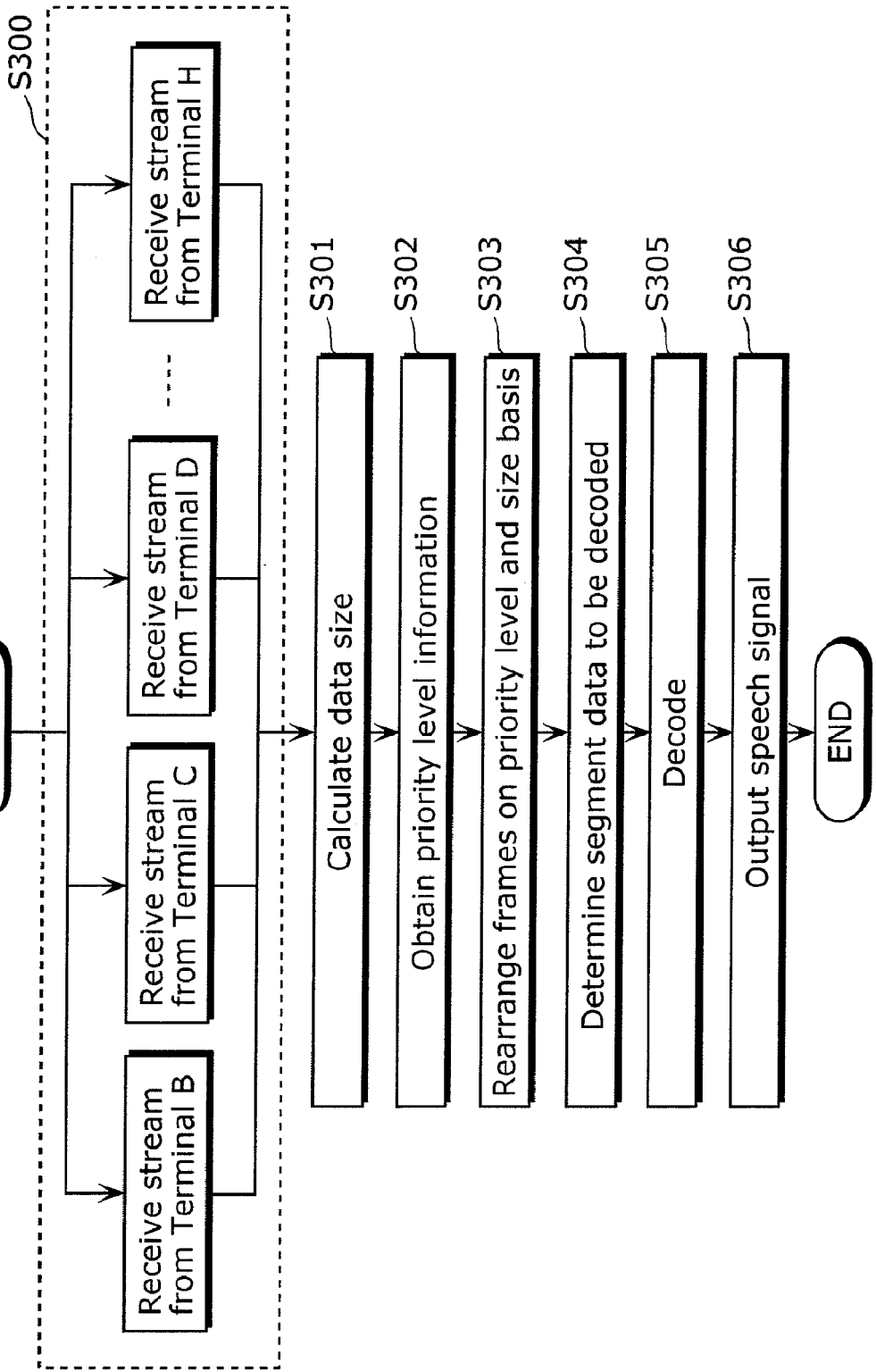
FIG. 11 is a flowchart showing a flow of processing regarding reception of the data stream in the teleconference terminal apparatus of the second embodiment.

FIG. 11 is a flowchart showing a flow of processing regarding reception of a data stream in the teleconference terminal apparatus 700 of the second embodiment.

As shown in FIG. 11, a data stream transmitted from each of terminals via the IP network is received by the receiving unit 705 (S300).

The filtering unit 706 refers to priority level information of each of received data streams and a data size of each of the frames in the corresponding received data stream in order to determine whether or not segment data included in each of the data streams; that is each of frames included in the corresponding data stream, is decoded.

Specifically, similar to the filtering unit 206 in the first embodiment, the filtering unit 706 calculates a data size of a frame at a specific time out of each of the data streams, from the corresponding terminal, received by the receiving unit 705 (S301).

Moreover, the priority level obtaining unit 711 reads the priority level information out of each of the data streams, from the corresponding terminal, received by the receiving unit 705. The read priority level information is forwarded to the filtering unit 706 (S302).

The filtering unit 706: first rearranges the frames in the order of having a higher priority level; and then rearranges the prioritized frames in a descending order in data size in the case where there are plural frames having the same priority (S303). Here, the filtering unit 706 determines a frame having no corresponding priority level information that the frame has the lowest priority level, and rearranges the frame.

Based on the result of the above rearrangements, the filtering unit 706 selects the frames with two highest-prioritized frames, and decodes the selected two frames, for example.

Figure 12:
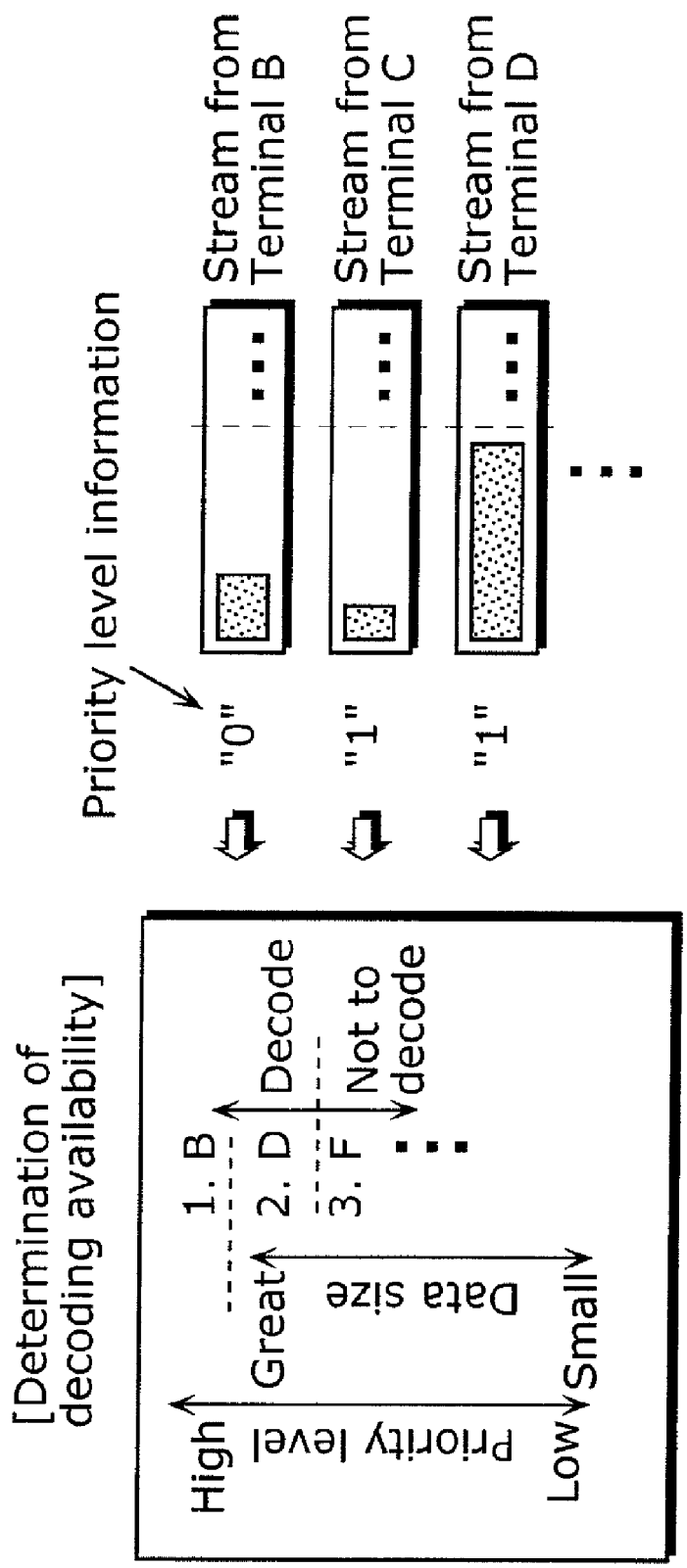
FIG. 12 exemplifies processing to determine availability of decoding which takes priority level information into account in the teleconference terminal apparatus of the second embodiment.

FIG. 12 is a schematic view exemplifying processing to determine availability of decoding which takes the priority level information into account in the teleconference terminal apparatus 700 of the second embodiment.

As shown in FIG. 12, the frame in Terminal B is not the greatest in data size. The data stream received from Terminal B, however, has "0" assigned as the priority level information, and thus the filtering unit 706 gives the frame from Terminal B the highest priority as a frame to be decoded.

Further, the filtering unit 706 rearranges in a descending order according to data size the other plural frames associated with Priority level information "1".

As the result of the rearrangement, the filtering unit 706, as shown in FIG. 12, determines that decoded are the frames having the two-highest prioritized pieces of segment data to be decoded.

In other words, selected to be decoded are the frame having the highest priority level from Terminal B and the frame from Terminal D having the greatest data size out of the frames from the rest of Terminals C to H.

Upon executing the above determination processing, decoding processing is executed as is done in the first embodiment. Specifically, the decoding unit 707 decodes a frame of which the filtering unit 706 has determined the decoding (S305), and the mixing unit 708 mixes the two speech signals obtained from the decoding unit 707 according to a replay environment of the teleconference terminal apparatus 700.

At the end, output unit 709 outputs a mixed signal obtained from the mixing unit 708 (S306).

It is noted that the priority level information assigned to a data stream by each terminal is set based on the number and attributes of the participants using the terminals. Priority level information corresponding to each of the terminals may be shared among all the terminals. A terminal may determine priority level information corresponding to each of the terminals and transmit the priority level information to each of the terminals except the setting terminal in order to prevent discrepancy and confusion.

For example, Priority level information "0" is transmitted from Terminal A to Terminal B. Further, Priority level information "1" is transmitted from Terminal A to each of Terminals C to H.

Terminal B receives Priority level information "0", and assigns Priority level information "0" to a data stream which Terminal B itself provides. Each of Terminals C to H assigns a data stream Priority level information "1".

This allows the data stream transmitted from Terminal B to be preferentially decoded by the other terminals.

In other words, a statement from a participant using Terminal B is preferentially delivered to other participants using another terminal. As described above, each terminal is structured not to set the priority level information corresponding to the terminal itself at random in order to prevent discrepancy and confusion.

The teleconference terminal apparatus 700 in the second embodiment selectively decodes segment data, taking into account priority level information assigned to a data stream, as described above.

In other words, at least the segment data having the highest priority level never fails to be decoded regardless of the degree of the speech amplitude. This makes possible preferential decoding of a speech from a special terminal; that is, the terminal for a moderator in an audio teleconference.

Third Embodiment

Figure 13:
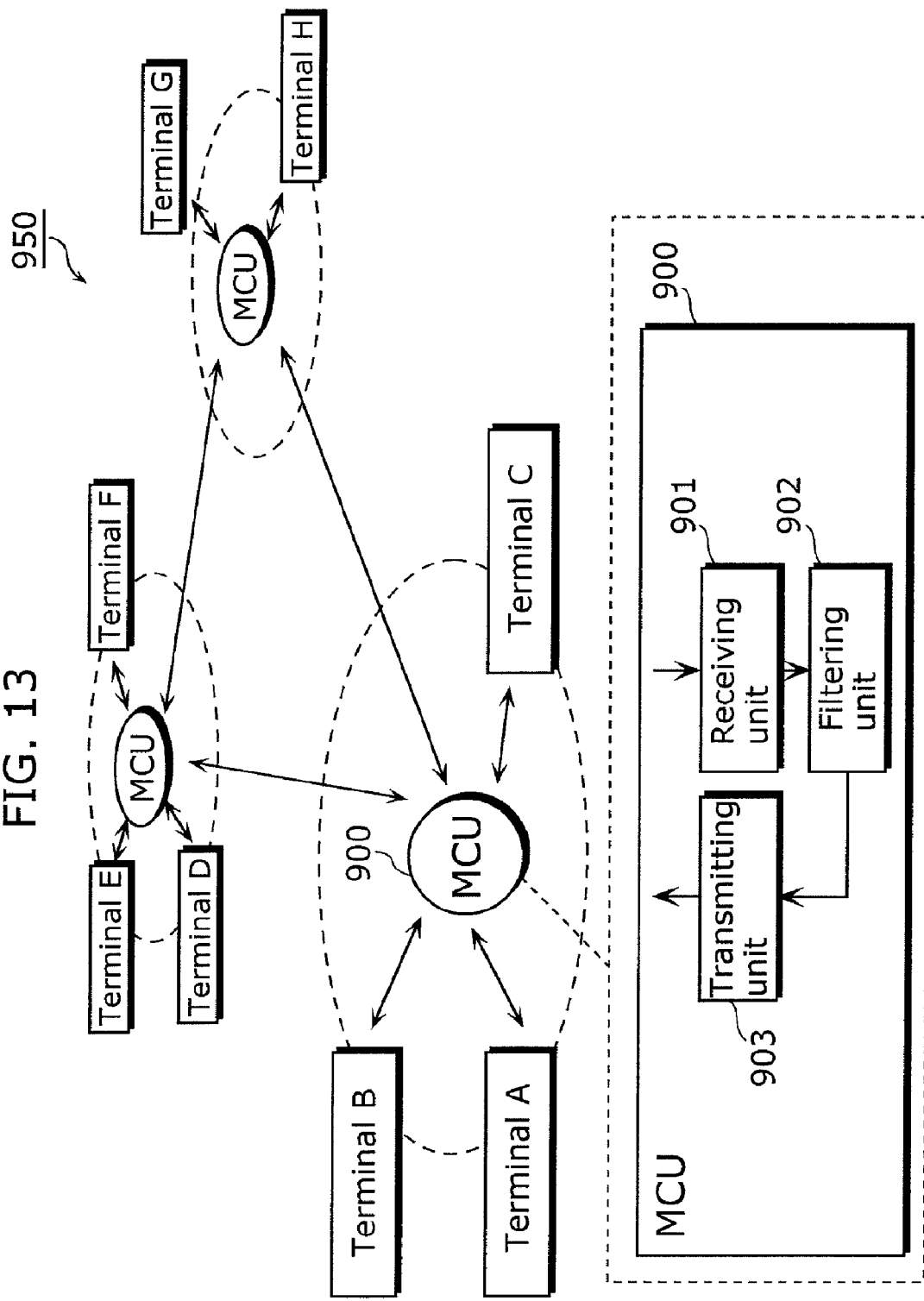
FIG. 13 shows a structure of a multipoint teleconferencing system in a third embodiment of the present invention.

FIG. 13 shows a structure of a multipoint teleconferencing system 950 in a third embodiment of the present invention.

The multipoint teleconferencing system 950 in the third embodiment includes an MCU (Multipoint Connection Unit) 900 having a filtering unit 902.

The MCU 900 includes a receiving unit 901, a transmitting unit 903, and the filtering unit 902.

The filtering unit 902 determines, based on a data size, whether or not a frame included in a data stream received by the receiving unit 901 is transmitted to a terminal apparatus other than the source terminal apparatus transmitting the data stream.

The transmitting unit 903 transmits the frame selected by the filter unit 902 to the terminal apparatus other than the source terminal apparatus transmitting the data stream.

It is noted that the MCU 900, an example of a relaying apparatus in the present invention, is connected to plural terminals, including Terminal A, via the IP network.

Moreover, the transmitting unit 903 and the receiving unit 901 in the third embodiment have similar functions as the transmitting unit 204 and the receiving unit 205 have in the first embodiment.

A mesh-type multipoint teleconferencing system has seen an increase in the network traffic as the number of simultaneously participating terminals increases.

Hence, in order to decrease the traffic, the multipoint teleconferencing system 950 in the third embodiment forms a star-type network including plural MCUS 900, and filters streams in the MCUS 900 as seen in the first embodiment.

It is noted that each of Terminals A to H includes, for example, the analyzing unit 202 and the coding unit 203 in the first embodiment. In other words, a data size, of each of frames in a corresponding data stream provided from associated one of Terminals A to H, reflects speech amplitude as seen in the first embodiment.

In the third embodiment, the MCU 900 is directly connected to an adjacent terminal. In other words, the MCU 900 is directly connected to the adjacent terminal, without relaying via another MCU 900. Further, the MCU 900 is connected to a distant terminal via another MCU 900.

In such a structure, each of the MCUS 900 receives a data stream transmitted from Terminals A to H.

For example, the receiving unit 901 of the MCU 900 directly connected to Terminals A and B receives data streams each transmitted from Terminals A to H.

Based on the data size of each of the frames in the corresponding data stream received by the receiving unit 901, the filtering unit 902 determines whether or not the frame included in the data stream is decoded.

Specifically, the filtering unit 902 selects as many frames as a predetermined number in a descending order in data size out of plural frames corresponding to plural speech signals to be simultaneously forwarded.

For example, the filtering unit 902 selects the two greatest frames in data size out of the frames from Terminals A to H, and forwards the two frames to the transmitting unit 903.

The transmitting unit 903 transmits to a terminal the frame forwarded from the filtering unit 902, the terminal which is not the source terminal of the forwarded frame among Terminals A and C directly connected to the MCU 900.

In the case where the filtering unit 902 selects the frames from Terminals A and F out of the frames from Terminals A to H at a point of time, for example, the transmitting unit 903 transmits the frame from Terminal A to Terminals B and C. In addition, the transmitting unit 903 transmits the frame from Terminal F to Terminals A, B, and C.

It is noted that each of filter units 902 in the corresponding MCU 900 is set to select the same number of pieces of segment data. In other words, the embodiment sees that each of the filtering units 902 included in the corresponding three of MCUS 900 shown in FIG. 13 is set to select the greatest two frames in data size.

Further, the filtering unit 902 may select segment data, using a standard other than the above standards. As described above, for example, the filtering unit 902 may select an appropriate frame by comparing a threshold and a data size. Moreover, the filtering unit 902 may select frames by removing out of plural frames, a predetermined number of frames selected in an ascending order according to data size, and cause the transmitting unit 903 to transmit the selected frames.

As described above, the MCU 900 in the third embodiment selectively transmits plural data streams received from each of the terminals based on a data size on a predetermined segment basis.

In other words, eliminating the need for decoding the data streams, the MCU 900 can select segment data having large speech amplitude, which is assumed to be necessary for an audio teleconference, and transmit the selected segment data to each of the terminals.

This makes possible yielding the increase in traffic in the multipoint teleconferencing system 950 even in the case where the number of simultaneously participating terminals increases. Further, eliminating the need for decoding a data stream, the MCU 900 can handle a larger number of simultaneously participating terminals than the case where decoding is executed.

Moreover, the multipoint teleconferencing system 950 includes the plural MCUS 900 to spread load in filtering a data stream even in the case where the number of simultaneously participating terminals increases, which makes possible holding a comfortable audio teleconference.

Fourth Embodiment

Figure 14:
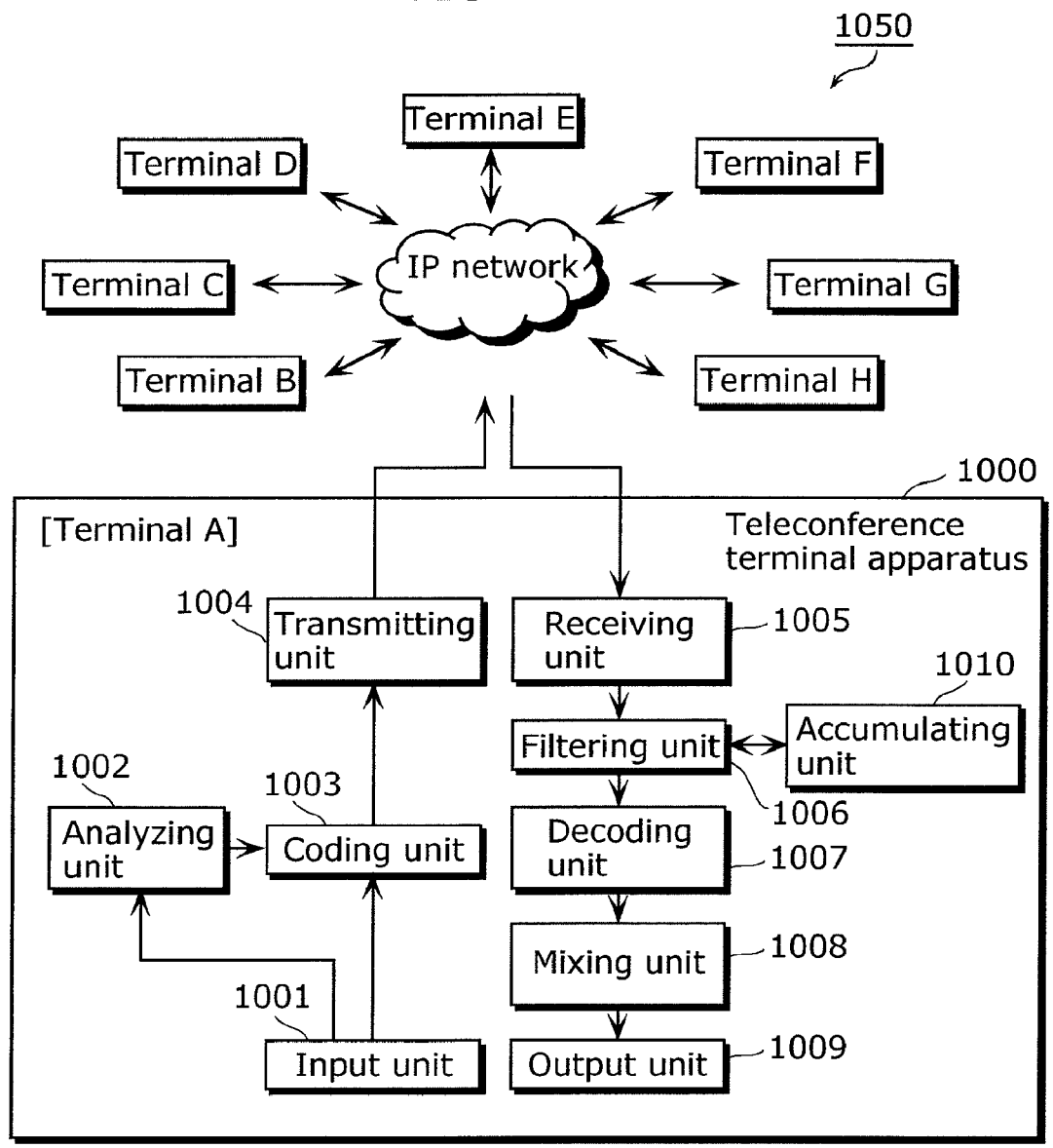
FIG. 14 shows a structure of a multipoint teleconferencing system in a fourth embodiment of the present invention.

FIG. 14 shows a structure of a multipoint teleconferencing system 1050 in a fourth embodiment of the present invention.

A teleconference terminal apparatus 1000 in the fourth embodiment includes an input unit 1001, an analyzing unit 1002, a coding unit 1003, a transmitting unit 1004, a receiving unit 1005, a filtering unit 1006, a decoding unit 1007, a mixing unit 1008, an output unit 1009, and an accumulating unit 1010.

As described above, the teleconference terminal apparatus 1000 in the fourth embodiment includes the accumulating unit 1010, as well as the processing units included in the teleconference terminal apparatus 200 of the first embodiment.

The accumulating unit 1010 accumulates segment data which is left undetermined to decode by the filtering unit 1006. The accumulating unit 1010 is realized out of a storing apparatus including, for example, a semi-conductor memory.

The following describes the newly-added structural elements in details, and omits the description of the other structural elements similar to those in the first embodiment.

The characteristic processing to be executed by the teleconference terminal apparatus 1000 shall be described, using FIG. 15.

FIG. 15 illustrates accumulation and decoding of a frame performed by the teleconference terminal apparatus 1000 in the fourth embodiment of the present invention.

As shown in FIG. 15, assumed is the case where the frames from Terminals B and C are to be decoded since greater than the other frames in data size, and thus the frame from Terminal D is not decoded.

This case sees that the frame, from Terminal D, which the filtering unit 1006 does not determine to decode; that is a frame filtered by the filtering unit 1006, is temporarily accumulated in the accumulating unit 1010.

Then, when the number of simultaneously speaking speakers decreases, and the decoding unit 1007 is able to execute decoding, the accumulating unit 1010 provides to the filtering unit 1006 the accumulated frame from Terminal D.

The filtering unit 1006 forwards the frame obtained from the accumulating unit 1010 to the decoding unit 1007, and the decoding unit 1007 decodes the frame. The speech signal obtained by the decoding is outputted by the output unit 1009.

It is noted that the accumulated frame is deleted when the frame, accumulated for a certain period, cannot be replayed.

This makes possible decoding speeches which cannot be simultaneously decoded under normal circumstances depending on performance of the teleconference terminal apparatus 1000 by staggering decoding times. It is noted that two or more frames may be accumulated into the accumulating unit 1010.

For example, assumed is a case where the accumulating unit 1010 accumulates four frames. This case sees that when the number of simultaneously speaking speakers decreases, and the decoding unit 1007 is able to execute decoding, the filtering unit 1006 obtains the four frames out of the accumulating unit 1010.

Further, the filtering unit 1006 rearranges the four frames in a descending order in data size, selects the two greatest frames in data size, and provides the two frames to the decoding unit 1007. In other words, the filtering unit 1006 determines availability of decoding on the plural frames accumulated in the accumulating unit 1010, as well.

This allows the decoding unit 1007 to be free from unnecessary load even in the case where a lot of frames are accumulated in the accumulating unit 1010. Moreover, out of undecoded plural frames, a possibly much-needed frame for the audio teleconference may possibly be decoded.

Supplementary Matters to Embodiments 1 to 4

The first to fourth embodiments described above have seen that the number of selected frames to be decoded out of the plural frames is two, for example.

Meanwhile, the number of selected frames to be decoded in parallel may be adjusted in a series of teleconferences, instead of being fixed.

For example, data sizes of plural frames corresponding to plural speech signals to be provided in parallel are summed up. Further, when the summed data size is greater than the predetermined threshold, the number of selected frames to be decoded may be increased from two to three.

For example, by selecting two frames to be decoded out of the plural frames under normal circumstances so that the processing load on the terminals can be reduced, and by increasing the number of selected frames to be decoded to three out of the plural frames as more participants speak, the above allows each participants to listen to speeches of more participants.

Further, the data size in each piece of the segment data may be adjusted depending on information other than the speech amplitude. For example, the analyzing unit 202 (702 or 1002) obtains a direction from a participant using the terminal. Following the direction, the analyzing unit 202 (702 or 1002) increases the data size of the frame for a certain period.

This enables the participant to deliver his or her speech to the other participants regardless of magnitude of speech amplitude in the case where the speech should not be missed by any of the other participants.

Moreover, the first to fourth embodiments see adjusting the data size in the data stream on a frame basis; instead, the data size may be adjusted on another unit basis.

For example, the analyzing unit 202 (702 or 1002) may calculate a target size on plural frames basis, and the coding unit 203 (703 or 1003) may code each of the frames, so that a sum of data sizes on the plural frames basis becomes equivalent to the calculated target size.

Further, in each of the multipoint teleconferencing systems 250, 750, 950, and 1050, the network connecting each of the terminals may be a network other than the IP network. For example, the network may be an IEEE 1394 network.

In addition, the structural elements described in each of the embodiments may adopt any given combination. For example, the teleconference terminal apparatus 700 including the priority level setting unit 710 and the priority level obtaining unit 711 in the second embodiment may include the accumulating unit 1010 in the fourth embodiment.

This allows the teleconference terminal apparatus 700 to decode and provide an undecoded frame during a period with a light load in decoding, as well as to execute data stream processing, taking a priority level into account.

Other Modification Examples

The above embodiments have described the present invention; meanwhile, the present invention shall not be limited to the above embodiments, as a matter of course. The following cases shall be included in the present invention.

(1) Specifically, each of the above described apparatuses is included in a computer system which consists of a micro processor, a ROM (Read-Only Memory), a RAM (Random Access Memory), a hard disk unit a keyboard, and a mouse. The RAM or the hard-disk unit stores a computer program. The microprocessor operates on the computer program, which causes each of the units to implement a function thereof. Here, the computer program includes a combination of plural instruction codes sending an instruction to the computer in order to achieve a predetermined function.

(2) Some or all of the structural elements having each of the above described apparatus may be included in a single system Large Scale Integration (LSI). A system LSI, an ultra-multifunction LSI, is manufactured with plural structural units integrated on a single chip. Specifically, the system LSI is a computer system having a micro processor, a ROM, and a RAM. The RAM stores a computer program. The system LSI achieves the function thereof by the micro processor operating on the computer program.

(3) Some or all of the structural elements having each of the above described apparatuses may be included in an IC card or a single module detachable to and from each of the apparatuses. The IC card or the module is a computer system which consists of a micro processor, a ROM, and a RAM. The IC card and the module may also include the above described ultra-multifunction LSI. The micro processor operates on the computer program, which allows the IC card and the module to achieve the function thereof. The IC card and the module may also be tamper-resistant.

(4) The present invention may be in methods described above. The present invention may also be a computer program executing the methods by a computer and a digital signal including the computer program.

The present invention may further include a computer-readable recording medium which stores the computer program or the digital signal into a flexible disk, a hard disk, a CD-ROM, an MO, a DVD, a DVD-ROM, a DVD-RAM, a BD (Blu-ray Disc) and a semi-conductor memory. The present invention may also be the digital signal recorded in the recording media.

The present invention may further transmit the computer program or the digital signal via a network and data broadcast mainly including an electronic communications line, a wireless or a wired communications line and the Internet.

The present invention may also be a computer system including a micro processor and a memory. The memory may record the computer program described above, and the micro processor may operate on the computer program.

The present invention can be implemented by another independent computer system by storing to transfer the program or the digital signal in a recording medium or via a network.

(5) The present invention may be a combination of the above embodiment with any of the above modification examples.

A teleconferencing system in the present invention serves as a multipoint teleconferencing system using a codec generating streams employing variable length frames, such as the MPEG2 AAC. Moreover, a teleconference terminal apparatus and a relaying apparatus in the present invention serve as a teleconference terminal apparatus and a relaying apparatus in the multipoint teleconferencing system.

The invention claimed is:

1. A teleconference terminal apparatus which performs speech communications with another terminal apparatus via a network, said teleconference terminal apparatus comprising:
   an input unit configured to receive a speech signal;
   an analyzing unit configured to analyze the speech signal received by said input unit and to calculate a target size based on a result of the analysis, the target size representing a coded data size regarded as a target of the speech signal on a predetermined segment basis;
   a coding unit configured to code the speech signal to generate a data stream, so that the coded data size on the predetermined segment basis becomes the target size corresponding to each of predetermined segments;
   a stream transmitting unit configured to transmit to the network the data stream generated by said coding unit;
   a receiving unit configured to receive the data stream transmitted from the other terminal apparatus;
   a filtering unit configured to determine whether or not segment data is to be decoded on a basis of the data size for each predetermined segment in the data stream received by said receiving unit, the segment data being designated on the predetermined segment basis and included in the data stream;
   a decoding unit configured to decode segment data determined to be decoded by said filtering unit to generate a speech signal; and
   an output unit configured to output the speech signal generated by said decoding unit.

2. The teleconference terminal apparatus according to claim 1
   wherein said analyzing unit is configured to obtain on the predetermined segment basis speech amplitude of the speech signal received by said input unit through the analysis, and to calculate the target size on the predetermined segment basis so that the speech amplitude on the predetermined segment basis and the target size on the predetermined segment basis are in a positive correlation.

3. The teleconference terminal apparatus according to claim 1
   wherein said other terminal constitutes one of a plurality of other terminals,
   said receiving unit is configured to receive each of data streams transmitted from said other terminals, and
   said filtering unit is configured to select a predetermined number of pieces of segment data in a descending order according to data size out of pieces of segment data, and to determine to decode the selected pieces of segment data, the pieces of segment data corresponding to associated speech signals, to be provided in parallel, included in corresponding data streams received by said receiving unit.

4. The teleconference terminal apparatus according to claim 3, further comprising
   a mixing unit configured to mix the speech signals to generate a mixed signal,
   wherein said decoding unit is configured to decode the pieces of segment data which said filtering unit determines to decode so as to generate speech signals,
   said mixing unit is configured to mix the speech signals generated by said decoding unit so as to generate the mixed signal, and
   said output unit is configured to output the mixed signal generated by said mixing unit.

5. The teleconference terminal apparatus according to claim 3, further comprising
   a priority setting unit configured to assign priority information to the data stream generated by said coding unit, the priority level information indicating a priority level of the data stream generated by said coding unit with respect to each of the data streams transmitted from the other terminals.

6. The teleconference terminal apparatus according to claim 3, further comprising
   a priority level obtaining unit configured to obtain priority level information indicating a priority level of the data stream received by said receiving unit,
   wherein, when the priority level information obtained by said priority level obtaining unit indicates that the data stream has a highest priority, said filtering unit is configured to determine to decode segment data included in the data stream regardless of a data size of the segment data.

7. The teleconference terminal apparatus according to claim 1, further comprising
   an accumulating unit configured to accumulate segment data which is left undetermined to decode by said filtering unit,
   wherein said decoding unit is further configured to decode the segment data accumulated in said accumulating unit to generate a speech signal while said decoding unit does not decode the segment data which said filtering unit has determined to decode, and
   said output unit is further configured to output the speech signal generated by said decoding unit decoding the segment data which is left undetermined to decode by said filtering unit.

8. A relaying apparatus which is connected to terminal apparatuses and relays transmission and reception of a data stream between the terminal apparatuses, said relaying apparatus comprising:
   a receiving unit configured to receive the data stream transmitted from any one of the terminal apparatuses;
   a filtering unit configured to determine whether or not segment data is to be transmitted to a terminal apparatus other than the terminal apparatus as a source terminal transmitting the data stream on a basis of a data size for each predetermined segment in the data stream received by said receiving unit, the segment data being designated on the predetermined segment basis and included in the data stream; and
   a data transmitting unit configured to transmit segment data to the terminal apparatus other than the terminal apparatus as the source terminal transmitting the data stream, the segment data being determined to be transmitted to said filtering unit.

9. A teleconferencing system which includes teleconference terminal apparatuses connected via a network and performs speech communications between the teleconference terminal apparatuses,
   wherein each of the teleconference terminal apparatuses includes:
   an input unit configured to receive a speech signal;
   an analyzing unit configured to analyze the speech signal received by said input unit and to calculate a target size based on a result of the analysis, the target size representing a coded data size regarded as a target of the speech signal on a predetermined segment basis;
   a coding unit configured to code the speech signal to generate a data stream, so that the coded data size on the predetermined segment basis becomes the target size corresponding to each of predetermined segments;

a stream transmitting unit configured to transmit to the network the data stream generated by said coding unit;

a receiving unit configured to receive the data stream transmitted from the other terminal apparatus;

a filtering unit configured to determine whether or not segment data is to be decoded on a basis of the data size for each predetermined segment in the data stream received by said receiving unit, the segment data being designated on the predetermined segment basis and included in the data stream;

a decoding unit configured to decode segment data determined to be decoded by said filtering unit to generate a speech signal; and an output unit configured to output the speech signal generated by said decoding unit.

10. A teleconferencing system which includes teleconference terminal apparatuses and a relaying apparatus connected via a network, and performs speech communications between the teleconference terminal apparatuses via the relaying apparatus, wherein each of the teleconference terminal apparatuses includes:

an input unit configured to receive a speech signal;

an analyzing unit configured to analyze the speech signal received by said input unit and to calculate a target size based on a result of the analysis, the target size representing a coded data size regarded as a target of the speech signal on a predetermined segment basis;

a coding unit configured to code the speech signal to generate a data stream, so that the coded data size on the predetermined segment basis becomes the target size corresponding to each of predetermined segments;

a stream transmitting unit configured to transmit to the relaying apparatus the data stream generated by said coding unit;

a receiving unit configured to receive segment data from the relaying apparatus, the segment data representing data designated for each predetermined segment, and included in a data stream transmitted from another teleconference terminal apparatus;

a decoding unit configured to decode the segment data determined to be decoded by said filtering unit to generate a speech signal; and an output unit configured to output the speech signal generated by said decoding unit, and the relaying apparatus includes:

a receiving unit configured to receive the data stream transmitted from any one of the teleconference terminal apparatuses;

a filtering unit configured to determine whether or not the segment data is to be decoded on a basis of the data size for each predetermined segment in the data stream received by said receiving unit, the segment data being designated on the predetermined segment basis and included in the data stream; and a data transmitting unit configured to transmit the segment data to a teleconference terminal apparatus other than the teleconference terminal apparatus as a source terminal transmitting the data stream, the segment data being determined to be decoded by said filtering unit.

11. A communications method which is performed by a teleconference terminal apparatus having speech communications with another terminal apparatus via a network, said communications method comprising:

obtaining a speech signal received by the teleconference terminal apparatus;

analyzing the obtained speech signal;

calculating a target size based on a result of said analyzing, the target size representing a coded data size regarded as a target of the speech signal on a predetermined segment basis;

coding the speech signal to generate a data stream, so that the coded data size on the predetermined segment basis becomes the target size corresponding to each of predetermined segments;

transmitting to the network the data stream generated in said coding;

receiving the data stream transmitted from the other terminal apparatus;

determining whether or not segment data is to be decoded on a basis of the data size for each predetermined segment in the received data stream, the segment data being designated on the predetermined segment basis and included in the data stream;

decoding segment data to be decoded to generate a speech signal; and outputting the generated speech signal.

12. A non-transitory computer readable medium having stored thereon a computer program for controlling an operation of a teleconference terminal apparatus performing speech communications with another terminal apparatus via a network, said computer program causing a computer to execute:

obtaining a speech signal received by the teleconference terminal apparatus;

analyzing the obtained speech signal;

calculating a target size based on a result of said analyzing, the target size representing a coded data size regarded as a target of the speech signal on a predetermined segment basis;

coding the speech signal to generate a data stream, so that the coded data size on the predetermined segment basis becomes the target size corresponding to each of predetermined segments;

transmitting to the network the data stream generated in said coding;

receiving the data stream transmitted from the other terminal apparatus;

determining whether or not segment data is to be decoded on a basis of the data size for each predetermined segment in the received data stream, the segment data being designated on the predetermined segment basis and included in the data stream;

decoding segment data to be decoded to generate a speech signal; and outputting the generated speech signal.

13. An integrated circuit included in a teleconference terminal apparatus performing speech communications with another terminal apparatus via a network, said integrated circuit comprising:

an analyzing unit configured to analyze a speech signal received by the teleconference terminal apparatus so as to calculate a target size based on a result of the analysis, the target size representing a coded data size regarded as a target of the speech signal on a predetermined segment basis;

a coding unit configured to code the speech signal to generate a data stream, so that the coded data size on the predetermined segment basis becomes the target size corresponding to each of predetermined segments;

a filtering unit configured to determine whether or not segment data is to be decoded on a basis of the data size for each predetermined segment in the data stream transmitted from the other terminal apparatus and received by the teleconference terminal apparatus, the segment data being designated on the predetermined segment basis and included in the data stream; and a decoding unit configured to decode segment data determined to be decoded by said filtering unit to generate a speech signal.

* * * * *